United States Patent [19]

Price, Sr. et al.

[11] Patent Number: 4,844,564

[45] Date of Patent: * Jul. 4, 1989

[54] HOLDER FOR TAPE CARTRIDGES

[75] Inventors: Macy J. Price, Sr., Golden; Macy J. Price, Jr., Broomfield; Laurence G. Ball, Denver, all of Colo.

[73] Assignee: Engineered Data Products, Inc., Broomfield, Colo.

[*] Notice: The portion of the term of this patent subsequent to Mar. 28, 2006 has been disclaimed.

[21] Appl. No.: 181,600

[22] Filed: Apr. 14, 1988

Related U.S. Application Data

[63] Continuation-in-part of Ser. No. 84,281, Aug. 11, 1987, Pat. No. 4,815,795, which is a continuation of Ser. No. 774,056, Sep. 9, 1985, Pat. No. 4,688,860.

[51] Int. Cl.⁴ .............................................. A47F 3/10
[52] U.S. Cl. .................................. 312/12; 206/387; 211/144; 312/11; 312/16; 312/319
[58] Field of Search .............. 211/41, 42, 40, 163, 211/131, 144; 312/9, 10, 11, 12, 13, 14, 125, 319, 242, 15, 16, 305, 266; 206/387

[56] References Cited

U.S. PATENT DOCUMENTS

| 3,710,900 | 1/1973 | Fink ................................ 312/10 X |
| 3,713,716 | 1/1973 | Stenger ........................... 312/10 X |
| 3,811,745 | 5/1974 | Cylke . |
| 3,862,787 | 1/1975 | Hilsinger ....................... 206/387 X |
| 3,995,921 | 12/1976 | Ackeret . |
| 4,239,109 | 12/1980 | Nielsen et al. . |
| 4,300,809 | 11/1981 | Brownlee ....................... 312/125 X |
| 4,549,775 | 10/1985 | Carter ............................ 312/13 X |
| 4,688,860 | 8/1987 | Accumanno et al. ........... 312/125 |
| 4,771,887 | 9/1988 | Nehl ............................... 312/319 X |

FOREIGN PATENT DOCUMENTS

| 2236661 | 2/1974 | Fed. Rep. of Germany . |
| 2433570 | 1/1976 | Fed. Rep. of Germany . |
| 2317184 | 2/1977 | France . |
| 16718 | of 1903 | United Kingdom ............... 211/144 |
| 634765 | 3/1950 | United Kingdom ............... 211/144 |
| 1598439 | 9/1981 | United Kingdom ............... 211/144 |

OTHER PUBLICATIONS

IBM brochure "Accessories for Cartridge System Tape", 1 page.
IBM Technical Disclosure Bulletin, vol. 16, No. 12, 5/1974, pp. 3839–3840.

Primary Examiner—Peter A. Aschenbrenner
Assistant Examiner—Thomas A. Rendos
Attorney, Agent, or Firm—Klaas & Law

[57] ABSTRACT

A holder for tape cartridges having a housing divided by a partition to form an upper section and a lower section each of which has a plurality of compartments integrally formed therewith from a relatively rigid plastic material so that a tape cartridge may be positioned in each of the compartments and separate resilient force applying structures, integrally formed from a plastic material more rigid than the plastic material in the housing, and secured to the housing so as to apply a resilient force against the tape cartridge in a compartment to urge the tape cartridge against portions of the housing to hold the tape cartridge in the compartment.

20 Claims, 7 Drawing Sheets

FIG. 1

HOLDER FOR TAPE CARTRIDGES

This application is a continuation-in-part of U.S. patent application Ser. No. 084,281 filed Aug. 11, 1987, now U.S. Pat. No. 4,815,795 issued Mar. 28, 1989, which application is a continuation of U.S. patent application Ser. No. 774,056 filed Sept. 9, 1985, now U.S. Pat. No. 4,688,860 issued Aug. 27, 1987.

FIELD OF THE INVENTION

This invention relates generally to a tape cartridge storage system in which a plurality of tape cartridges are stored in suitable means and which tape cartridges are removed when it is desired to use them and then returned to the tape cartridge storage system and more particularly to a truck and holders having means for temporarily storing a plurality of tape cartridges so that the holders may be placed on the truck which may be readily moved into the tape cartridge storage system to remove or return a plurality of tape cartridges.

BACKGROUND OF THE INVENTION

The use of computers in today's business operations has created two related problems associates with the tape cartridges used with the computers. The first problem relates to a storage system which is readily accessible so that tape cartridges can be removed from or returned to the storage system. There are commercially available trucks which are provided with means for holding a plurality of tape cartridges and which are provided with wheels for easy movement thereof. The trucks may be moved into the tape cartridge storage system, tape cartridges removed from the storage system and transported to the computer for use and then returned to the tape cartridge storage system. With the ever increasing cost of floor space, it is necessary and desirable that the aisle space in a tape cartridge storage system be kept to a minimum. This has resulted in limiting the size of the trucks used in transporting the tape cartridges and also in limiting the number of tape cartridges that can be loaded onto the truck.

BRIEF DESCRIPTION OF THE INVENTION

This invention provides a truck for use in transporting tape cartridges to and from a tape cartridge storage system and areas in which the tape cartridges are used. The truck is provided with means for holding a plurality of tapes which means have four sides in which tape cartridges may be positioned. The holding means are rotatably mounted so that the side from which the tape cartridges are to be returned to or retrieved from the tape cartridge storage system is readily accessible to the operator. The invention also provides a holder for tape cartridges which holder may be positioned in the holding means of the truck and has a plurality of separate compartments dimensioned to hold one tape cartridge and wherein resilient means are provided in each compartment to urge the tape cartridge against a plurality of stops so that the tape cartridge may be retained in the compartment or readily released therefrom.

In a preferred embodiment of the invention, the truck comprises a base on the bottom surface of which are secured a plurality of casters with at least one of the casters being swivelly mounted so that the truck can be turned but more preferably two casters are swivelly mounted. The truck has a generally rectangular horizontal cross-sectional configuration having two relatively long sides and two relatively short sides. A support wall is mounted on the base along one of the short sides. A support panel is secured to the upper end of the support wall and extends therefrom in a direction generally parallel to the base. Additional means are provided to maintain the support panel in the parallel position. Means are provided for holding a plurality of tape cartridges and such holding means are located between the support wall and the base. The holding means are provided with four sides into which holders, having tape cartridges therein, may be placed and such holding means is rotatably mounted so that one side may be readily accessible to the operator as desired. Means are provided to retain the rotatable holding means in a desired position. A space exists between the holding means and the support wall so that the holding means may be rotated. The capability of being able to utilize four sides for the temporary storage of the tape cartridges allows a maximum number of tapes to be stored on a truck of minimum dimensions.

In a preferred embodiment of the invention, the holder for the tape cartridges comprises housing means which are integrally molded using a relatively rigid plastic material and having an open side in the front portion thereof and wherein the housing means has a pair of opposite end wall portions, a top wall portion and a bottom wall portion. Partition means extend between and are integral with the pair of opposite end wall portions and divide the housing means into an upper section and a lower section. Each of the upper and lower sections are provided with a lower surface on which tape cartridges may be supported and an opposite upper surface. The upper section has a back wall portion integral with the pair of opposite end wall portions and the top wall portion and the back wall portion terminates at a location which is less than one-third the distance between the top wall portion and the partition means. The lower section has a back wall portion integral with the pair of opposite end wall portions and the partition means and the back wall portion terminates at a location which is less than one-third the distance between the lower surface and the upper surface thereof. Compartment forming means are provided in each of the upper and lower sections and form a plurality of individual compartments each of which has dimensions adapted to receive one tape cartridge therein. Lip means extend upwardly from the lower surface of each of the upper and lower sections and are located next adjacent to the front open side. Separate resilient force applying means are secured to the back wall portions of the upper and lower sections and apply a resilient force to the tape cartridge in each of the compartments to urge one portion of the tape cartridge into contact with the lip means and another portion of the tape cartridge into contact with the top wall portion. The resilient force applying means are formed from a plastic material more rigid than the relatively rigid plastic material of the housing means.

BRIEF DESCRIPTION OF THE DRAWING

An illustrative and presently preferred embodiment of the invention is shown in the accompanying drawings in which.

DETAILED DESCRIPTION OF THE INVENTION

Figure 1:
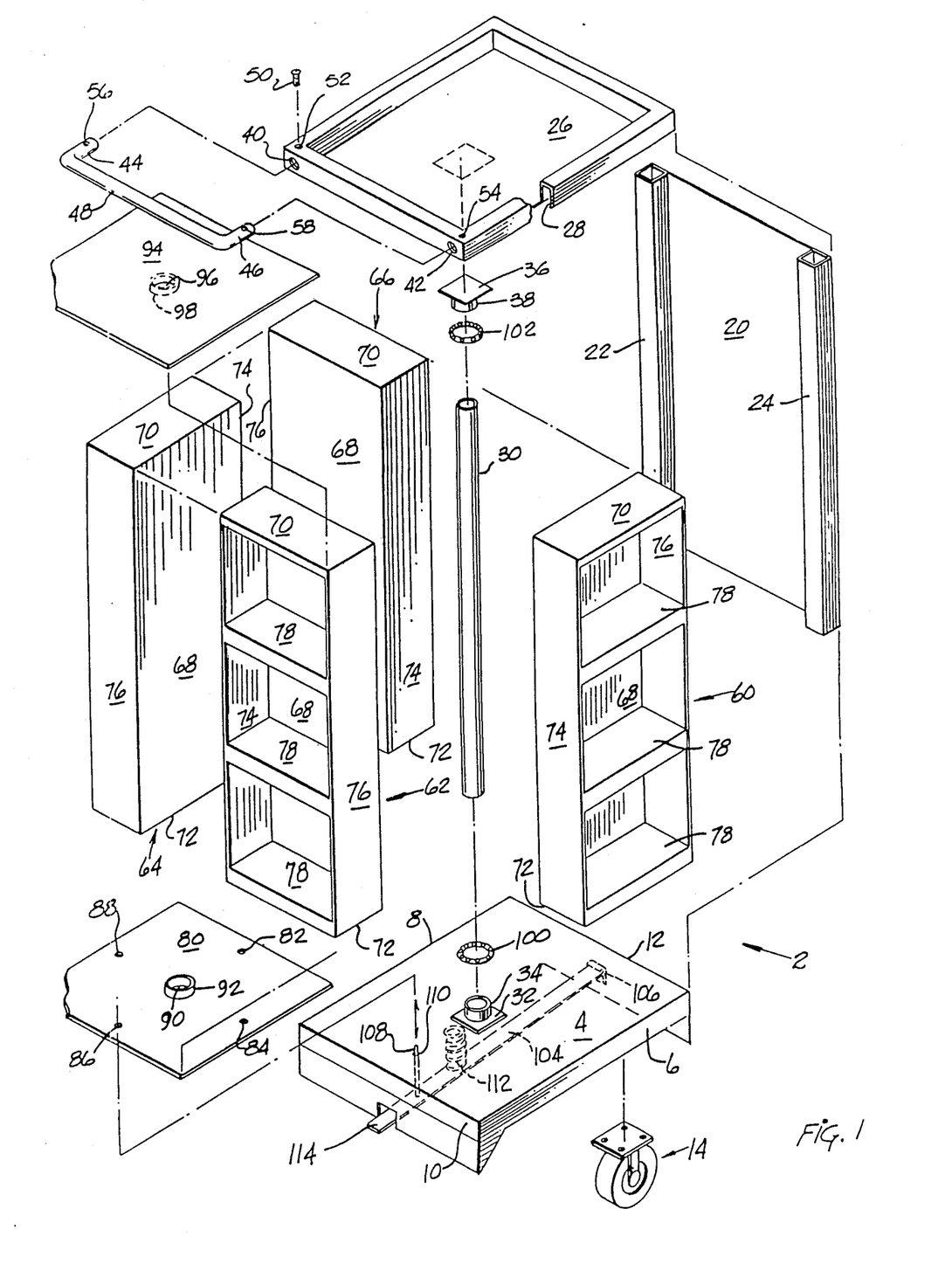
FIG. 1 is an exploded view of various components of a truck and one embodiment of the rotatably mounted means for holding tap cartridges of this invention.

A truck 2 of this invention is illustrated in FIG. 1 and comprises a generally rectangular base 4 having two relatively long sides 6 and 8 and two relatively short sides 10 and 12. A roller 14 is secured on the bottom of the base 4 adjacent to each corner thereof with the casters 16 and 18, illustrated in FIG. 2, being swivelly mounted casters.

A support wall 20 having two reinforcing columns 22 and 24 is secured to the base 4 along the relatively short side 12 by suitable means, such as by welding. A support panel 26 having a border formed by a U-shaped reinforcing channel 28 is secured to the top of the support wall 20. The support panel 26 extends outwardly from the support wall 20 in a direction so that it is generally parallel to the base 4. A cylindrical tube 30 extends between the support panel 26 and the base 4 and helps to support the support panel 2 in the parallel relationship with the base 4. The tube 30 is retained in position by means comprising a base 32 and a cylindrical sleeve 34 secured to the top surface of the base 4 and a base 36 and a cylindrical sleeve 38 secured to the bottom surface of the support panel 26. If desired the end of the cylindrical tube 30 can be secured in the cylindrical sleeve 34 by suitable means such as by welding or by a set screw.

The reinforcing channel 28 is provided with spaced apart openings 40 and 42 adapted to receive the ends 44 and 46 of a handle 48. The handle 48 is secured in position by suitable means such as screws 50 passing through openings 52 and 54 in the reinforcing channel 28 and threadedly secured in openings 56 and 58 in the handle 48.

The means for holding the tape cartridges on the truck 2 in one embodiment of the invention comprises four housings 60, 62, 64 and 66. Each of the housings 60, 62, 64 and 66 comprises a rear wall 68, a top wall 70, a bottom wall 72 and two opposing side walls 74 and 76. A plurality of spaced apart shelves 78 are secured at the end thereof to the adjacent side wall 74 or 76 by suitable means, such as by welding. The top wall 70 and the shelves 78 have a U-shaped cross-sectional configuration with the opening facing downwardly. The housings 60, 62, 64 and 66 are mounted on a plate 80 so that the outer surface of each side wall 74 is in contact with a portion of the outer surface of each rear wall 68. The plate 80 is provided with plurality of spaced apart openings 82, 84, 86 and 88 for a purpose to be described below. The plate 80 is provided with a central opening 90 having a reinforcing flange 92. The housings 60, 62, 64 and 66 are secured to the plate 80 by suitable means, such as by welding and are positioned on the plate 80 so that a central passageway extends between the facing portions of the back walls 68. The cross-sectional area of the central passageway is greater than the cross-sectional area of the cylindrical tube 30. A plate 94 having a central opening 96 having a reinforcing flange 98 is secured to each top wall 70 of the housings 60, 62, 64 and 66. A lower bearing means 100 and an upper bearing means 102 are provided for a purpose to be described below.

A truck 2 is assembled by securing the casters 14 to the bottom of the base 4 with the casters 16 and 18 being swivelly mounted. The base 32 and the support wall 20 are secured in position on the base 4. The cylindrical tube 30 is inserted into the cylindrical sleeve 34 and secured therein by welding. The lower bearing means 100, having an inner diameter greater than the outer diameter of the cylindrical tube 30 and the cylindrical sleeve 34, is moved over the cylindrical tube 30 and the cylindrical sleeve 30 so that the lower portion of the bearing means 100 is supported on the base 32. The housings 60, 62, 64 and 66 are secured to the plates 80 and 94 and are positioned around the cylindrical tube 30. The opening 90 in the plate 80 has an inner diameter greater than the outer diameter of the cylindrical tube 30 and the cylindrical sleeve 34 so that the plate 80 can be moved into contact with and supported by the upper portion of the bearing means 100. The upper bearing means 102, having an inner diameter greater than the cylindrical tube 30, is moved over the cylindrical tube 30 until the lower portion of the bearing means 102 is in contact with and supported by the plate 94. The base 36 is secured to the bottom surface of the support panel 26 and the top end of the cylindrical tube 30 is inserted into the cylindrical sleeve 3 and secured thereto by welding or a set screw. The outer diameter of the cylindrical sleeve 38 is less than the inner diameter of the opening 96 and the inner diameter of the bearing means 102 so that the cylindrical sleeve may be moved downwardly until the base 36 is in contact with and supported by the upper portion of the bearing means 102. The support panel is then secured to the top of the support wall 20. The ends 44 and 46 of the handle 48 are inserted through the openings 40 and 42 and secured to the reinforcing channel 28 by the screws 50. In this manner, the assembled housings 60, 62, 64 and 66 are rotatably mounted on the track 2.

Means are provided to retain the assembled housings 60, 62, 64 and 66 from rotating and comprises a lever 104 pivotally mounted on the bottom surface of the base 4 by pivot means 106. A pin 108 is mounted on the lever 104 and is positioned thereon so as to project through an opening 110 in the base 4. A torsion spring 112 is secured to the bottom surface of the base 4 and the top surface of the lever 104 and functions to urge the pin 108 upwardly so that the pin 108 projects upwardly through the opening 110 a distance to ensure that the end of the pin 108 will project into one of the openings 82, 84, 86 or 88 in the plate 80 so as to prevent rotation of the plate 80. When it is desired to rotate the plate 80 and therefore the assembled housings 60, 62, 64 and 66, the end 114 of the lever 104 is depressed so that the end of the pin 108 is removed from its position in one of the openings 82, 84, 86 and 88. After rotation of the assembled housings has been started, the end 114 of the lever is released so that the end of the pin 108 as urged by the spring 112 will automatically enter into the next one of the openings 82, 84, 86 or 88 and stop rotation of the assembled housings 60, 62, 64 and 66.

Figures 2, 3, 4, 5, 6:
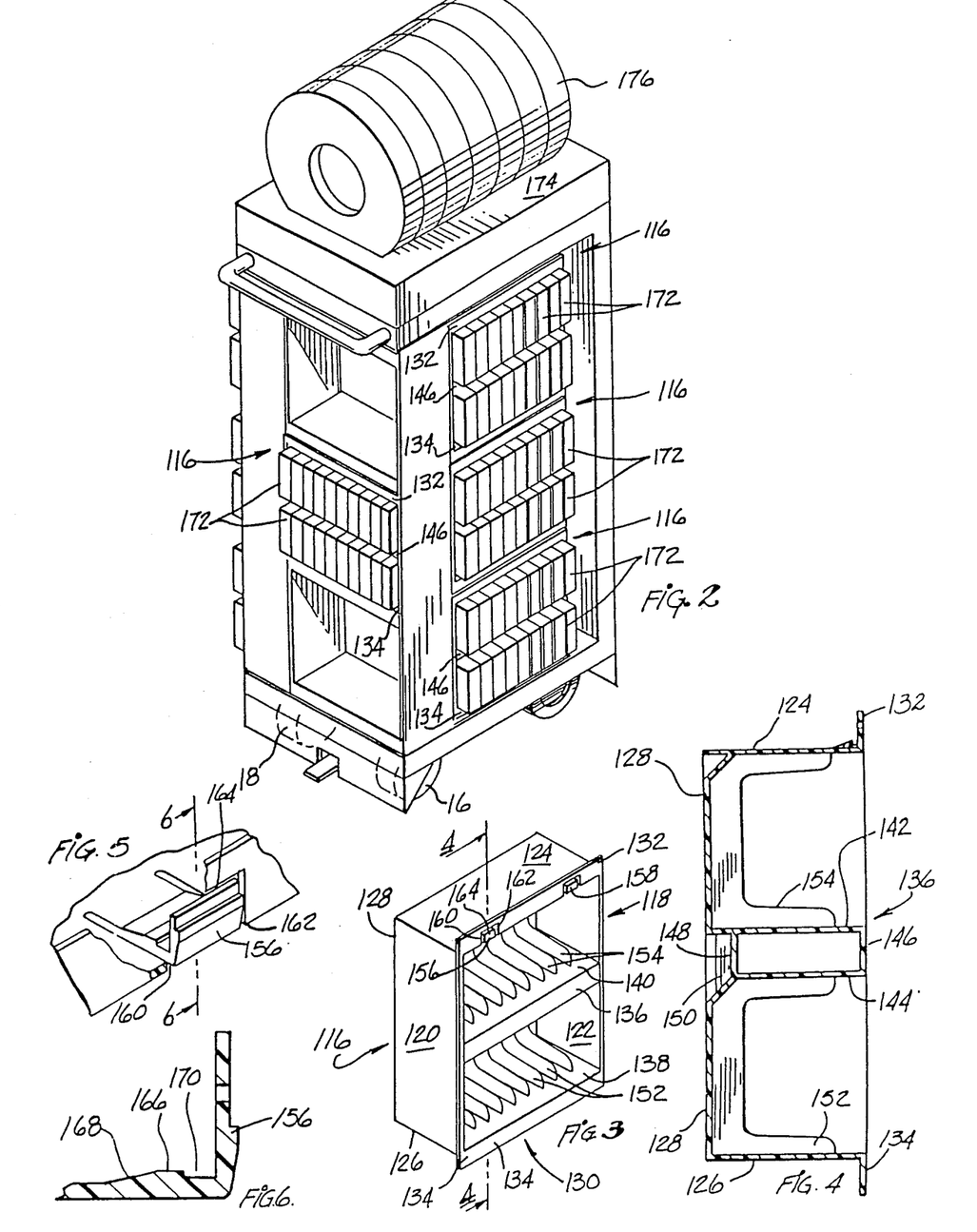
FIG. 2 is an assembled truck of this invention.
FIG. 3 is a pictorial view of a tape cartridge holder.
FIG. 4 is an enlarged cross-sectional view along the line 4—4 of FIG. 3.
FIG. 5 is a pictorial view of a retaining means.
FIG. 6 is a cross-sectional view along the line 6—6 of FIG. 5.

A tape cartridge storage holder 116 is illustrated in FIG. 3 and comprises a hollow housing 118 having end walls 120 and 122, a top wall 124, a bottom wall 126, a back wall 128 and a front opening 130. An upper flange 132 extends upwardly from the top wall 124 and a bottom flange 134 extends downwardly from the bottom wall 126. A panel 136 extends between the end walls 120 and 122 so as to divide the housing 118 in half and provide a bottom shelf 138 and a top shelf 140 on which tape cartridges may be supported. As illustrated in FIG. 4, the panel 136 has an upper portion 142 and a lower portion 144 joined by two vertically extending supports 146 and 148. A plurality of reinforcing ribs 150 extend between and are connected to the upper portion 142 and the lower portion 144. A plurality of partitions 152 extend upwardly from the bottom shelf 138 and extend continuously along the back wall 128 and extend downwardly from the lower portion 144 of the panel 136. A similar plurality of partitions 154 extend upwardly from the top shelf 140 and extend continuously along the back wall 128 and extend downwardly from the top wall 124. The partitions 152 and 154 effectively form a plurality of individual compartments each of which houses a tape cartridge.

Each tape cartridge holder 116 is provided with means for retaining the tape cartridge holder in position between adjacent shelves, illustrated in FIG. 5. Two spaced apart tabs 156 and 158 are formed in the top wall 124 and the upper flange 132. Each tab 156 and 158 is formed by a pair of spaced apart slots 160 and 162 joined by another slot 164. Each tab 156 and 158 have a projection 166 having an inclined cam surface 168. As the tape cartridge holder 116 is being inserted between adjacent shelves 78, the lower edge of the upper shelf 78 will contact the cam surface 168 and move the tab 156 downwardly. After the tape cartridge holder 116 has been fully inserted into position with the upper flange 132 and the lower flange 134 in contact the facing surfaces of the associated shelves 78, the lower end of the upper shelf 78 will be located in the space 170 formed by the projection 166. In another embodiment (not shown) of the invention, only one centrally mounted tab is used. In FIG. 2, a plurality of tape cartridge holders 116 having a plurality of individual tape cartridges 172 installed therein are illustrated in assembled position on the shelves. It is noted that each tape cartridge 172 extends outwardly beyond the surfaces of the panels 132 and 134 and the support 146 so that the individual tape cartridges 172 may be grasped during insertion and removal. When it is desired to remove the tape cartridge holder 116, the tabs 156 and 158 are depressed to move the projections downwardly and the tape cartridge holder 116 is removed. The upper and lower flanges 132 and 134 also serve as handles so that the tape cartridge holders 116 may be readily transported for use as a scratch tray, staging tray or off-site media container.

As illustrated in FIG. 2, a tray 174 for holding tape cartridge reels 176 has a bottom portion thereof (not shown) seated within the channel 28. If desired, the tray 174 can be shaped to hold tape cartridges.

The various components of the truck 1 are formed from metal such as steel so that they can be readily assembled by welding to form a strong rigid truck. The tape cartridge holders are preferably integrally molded using a high density plastic such as high impact styrene.

Figure 7:
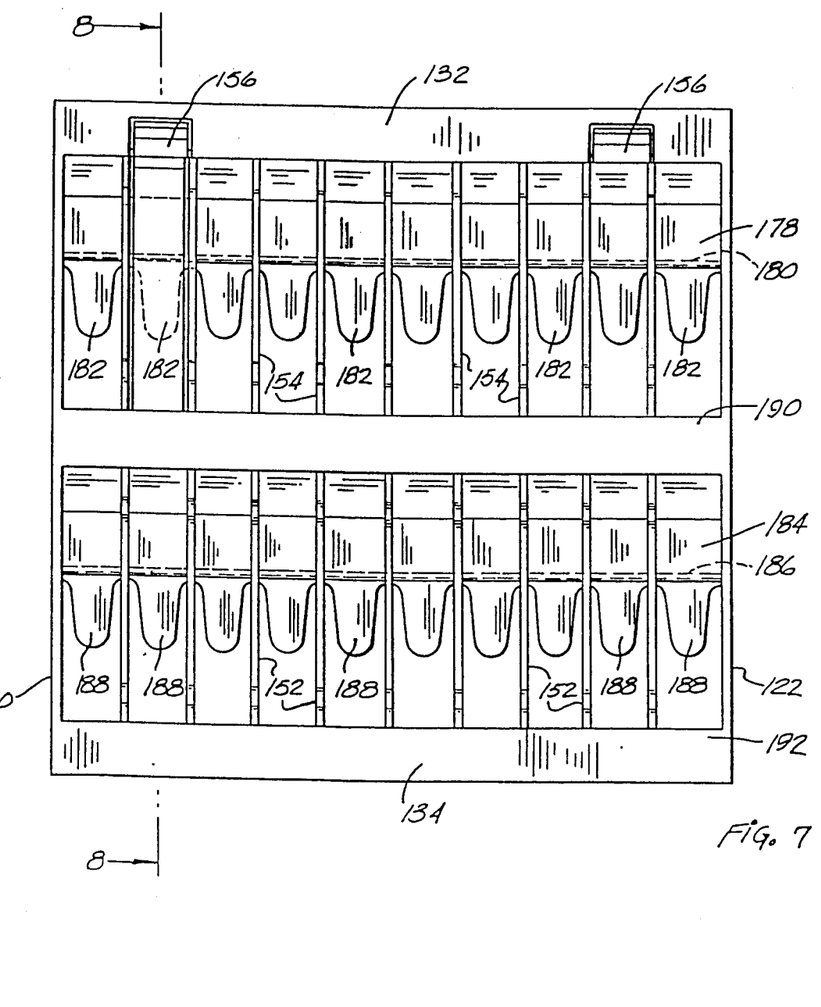
FIG. 7 is a front elevational view of another embodiment of a tape cartridge holder.
Figure 8:
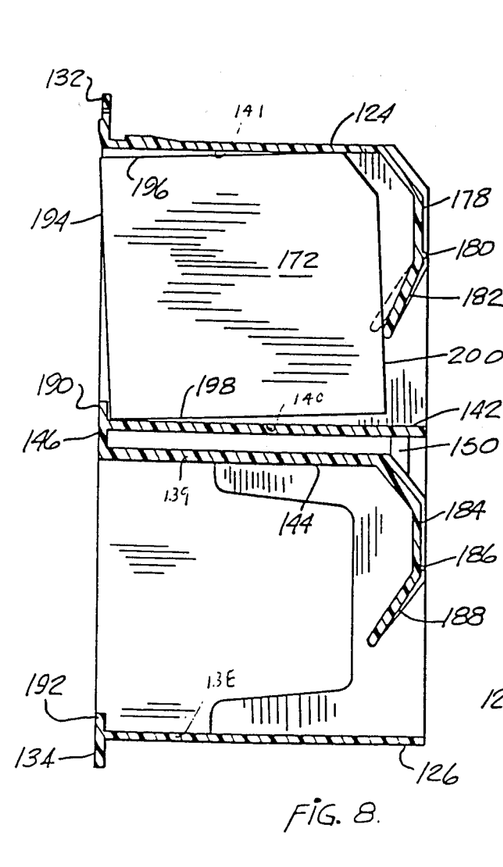
FIG. 8 is a view with parts in section taken along the line 8—8 of FIG. 7.

In the embodiment of the tape cartridge holder 116 illustrated in FIGS. 7 and 8, the portions thereof which correspond to the tape cartridge holder 116 illustrated in FIGS. 3-6 have been identified with the same reference numerals. The tape cartridge holder 116 illustrated in FIGS. 7 and 8 is provided with means for securely retaining each cartridge tape 172 in position in the holder 116. The securing means comprises a back wall 178 which extends downwardly from the top wall 124 and has a bottom edge 180 spaced substantially above the upper portion 142 which, as illustrated in FIG. 8, is less than one-half the distance between the shelf 140 and the upper surface 141. A plurality of resilient tabs 182 extend downwardly from the bottom edge 180 and project inwardly into the tape cartridge holder 116 for a purpose described below. Another back wall 184 extends downwardly from the lower portion 144 and has a bottom edge 186 spaced substantially above the bottom wall 126 which, as illustrated in FIG. 8, is less than one-half the distance between the shelf 138 and the upper surface 139. A plurality of resilient tabs 188 extend downwardly from the bottom edge 186 and project inwardly into the tape cartridge holder 116 for a purpose described below. A tape cartridge retaining rib 190 projects upwardly from the upper portion 142 and extends from end wall 120 to end wall 122. A similar tape cartridge retaining rib 192 projects upwardly from the bottom wall 126 and extends from end wall 120 to end wall 122.

The operation of the securing means is illustrated in FIG. 8. An individual tape cartridge 172 having a front 194, a top 196, a bottom 198 and a back 200 has been inserted into the tape cartridge holder 116. The distance from the top 196 to the bottom 198 of the tape cartridge 172 is less than the distance between the top of the retaining rib 190 to the bottom surface of the top wall 124 so that the individual cartridge tape 172 may pass therebetween. The individual cartridge tape 172 is moved inwardly so that the back 200 contacts and depresses a resilient tab 182. The force exerted by the depressed resilient tab 182 causes the individual cartridge tape 172 to tilt so that a portion of the bottom 198 contacts the surface of the upper portion 142 and a portion of the top 196 contacts the bottom surface of the top wall 124. Also, the force exerted by the depressed tab 182 urges the individual tape cartridge 172 outwardly so that a portion of the front 194 is moved into contact with the retaining rib 190. Thus, the individual cartridge tape 172 is securely retained in the tape cartridge holder 116. When it is desired to remove the individual cartridge tape 172, sufficient pressure is applied to the upper portion of the front 194 adjacent to the top 196 to tilt the individual cartridge tape 172 in the opposite direction so that the bottom 198 is above the retaining tab 190. The force of the depressed tab 182 will then move the individual cartridge tape 172 outwardly so that it may be readily removed from the tape cartridge holder 116.

Figures 9, 10:
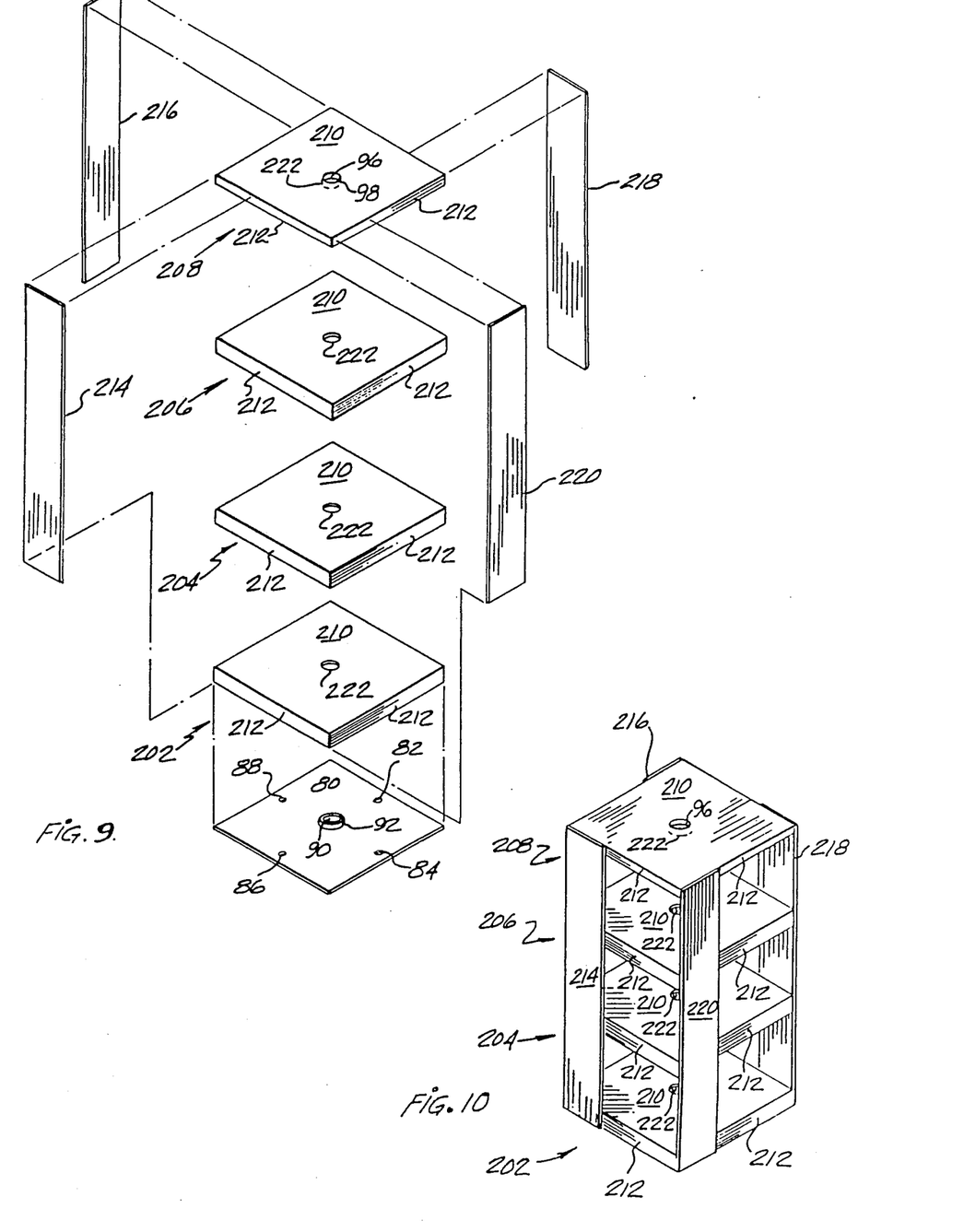
FIG. 9 an exploded view of another embodiment of the rotatably means for holding tape cartridges.
FIG. 10 an assembled view of FIG. 9.

Another embodiment of the rotatably mounted means for holding tape cartridges is illustrated in FIGS. 9 and 10 and includes the plate 80 and a plurality of shelves 202, 204, 206 and 208 each of which comprises a flat sheet 210 having four flanged side walls 212. The plate 80 is slightly smaller than the shelf 202 so that it fits inside thereof and is welded to the flanged side walls 212. A plurality of panels 214, 216, 218 and 220 are provided and as illustrated in FIG. 10 are welded to the flanged side walls 212 so that the shelves 202, 204, 206 and 208 are spaced apart at equal distance. Each of the shelves has a central opening 222. The assembled unit in FIG. 10 is positioned so that the cylindrical tube 30 passes through the openings 222. The plate 80 is supported on the bearing 100 and is capable of being rotated as described above. The shelves 202, 204, 206 and 208 rotate with the plate 80.

Figure 11:
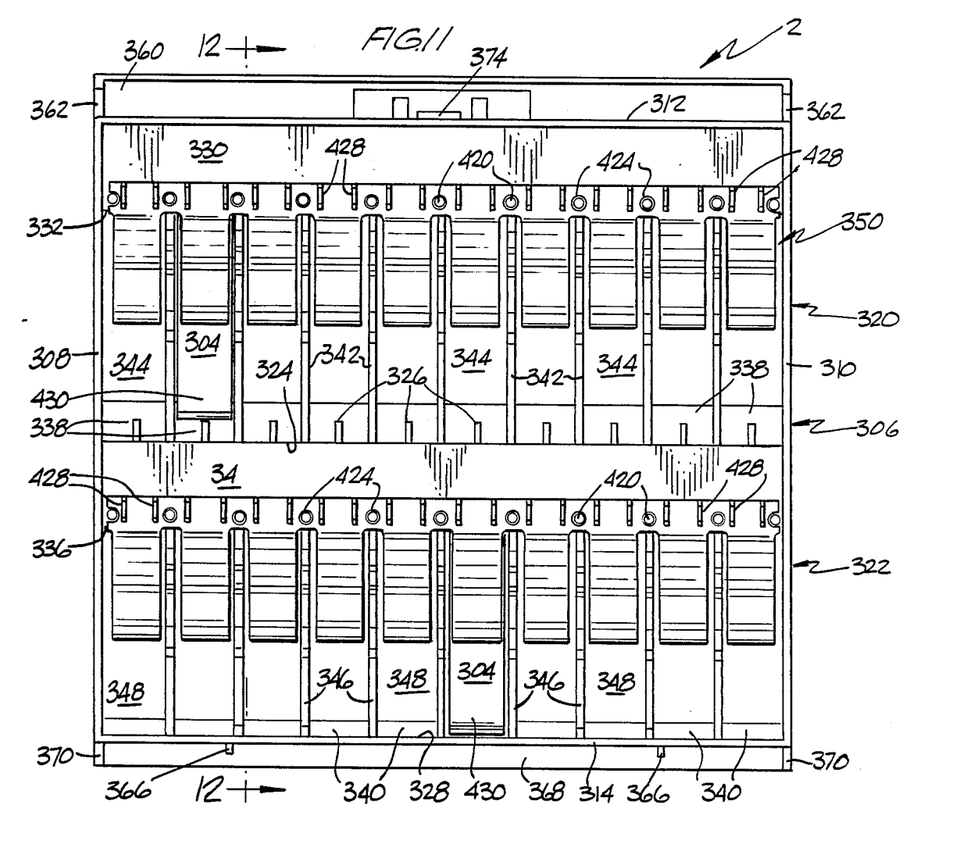
FIG. 11 is a rear elevational view of the preferred holder of this invention.
Figure 12:
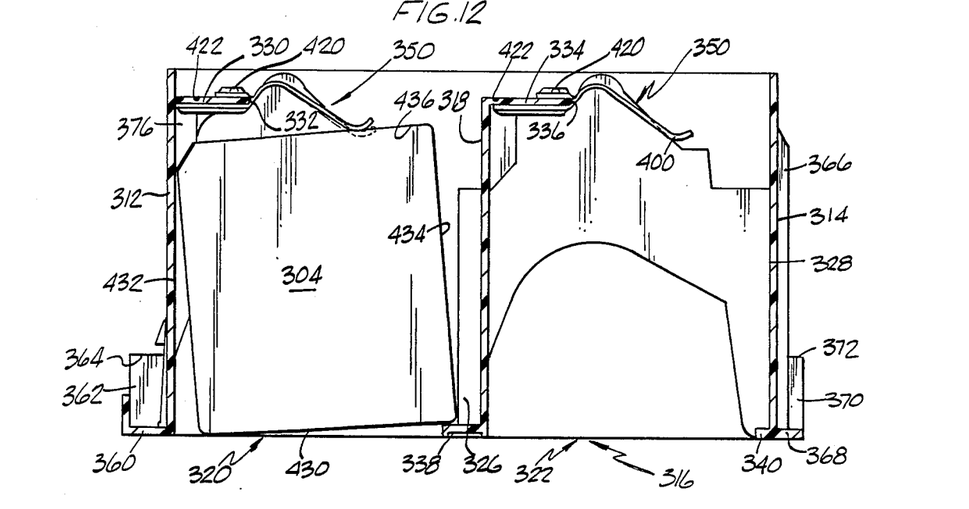
FIG. 12 is a cross-sectional view taken on the lines 12—12 of FIG. 11.
Figures 13, 14, 15, 15A:
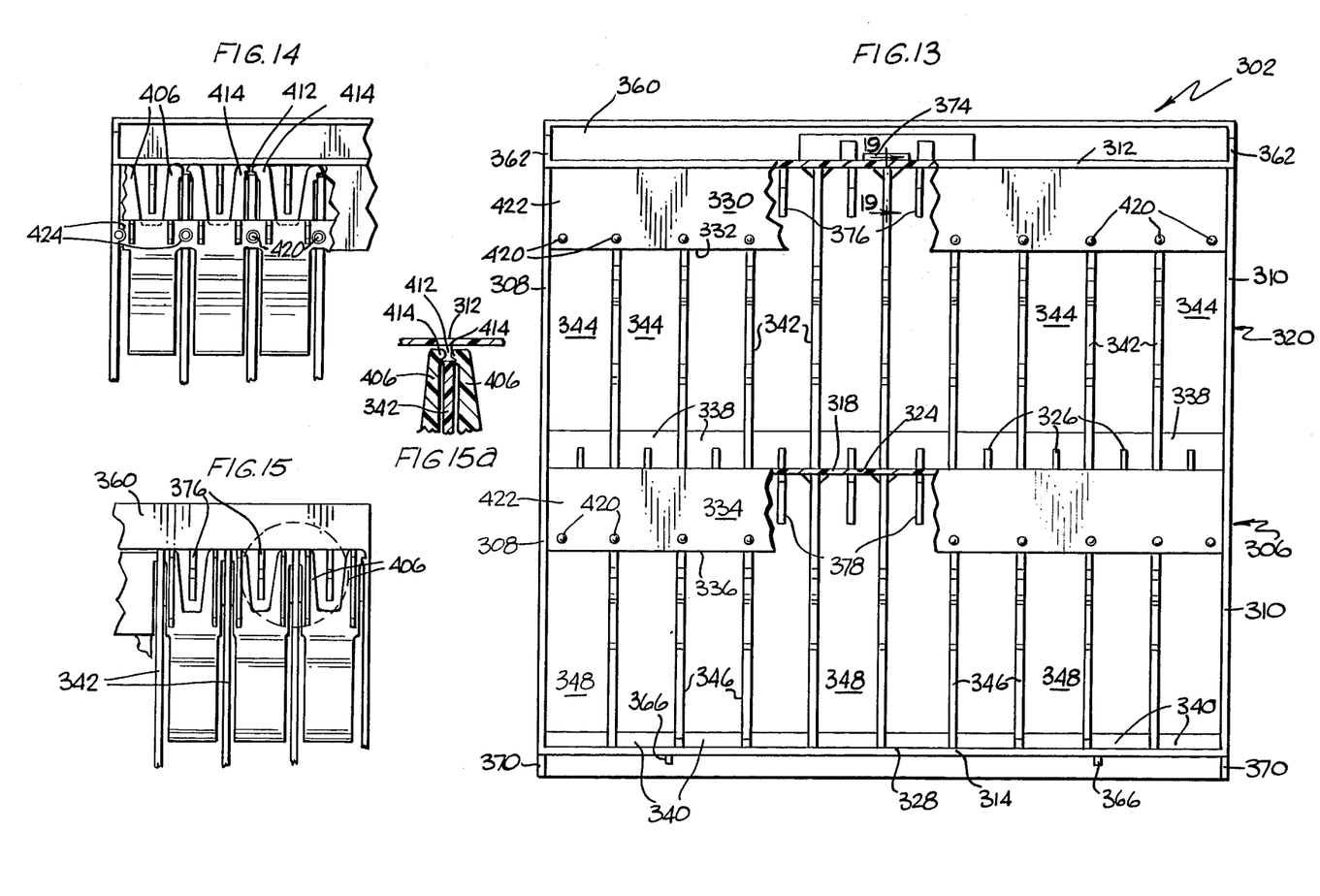
FIG. 13 is a rear elevational view of the housing means of the holder.
FIG. 14 is a rear elevational view of a portion of FIG. 1 with a portion of the back wall portion broken away.
FIG. 15 is a front elevational view of a portion of FIG. 1.
FIG. 15a is an enlargement of a portion of FIG. 15 in cross-section.

A preferred embodiment of the holder 302 for the tape cartridges 304 of this invention is illustrated in the drawings and in FIGS. 11–13, there is illustrated a holder 302 for tape cartridges 304 wherein the holder 302 comprises housing means 306 integrally molded from a relatively rigid plastic material such as a high impact polystyrene or other materials having similar characteristics. The housing means 306 has opposite end wall portions 308 and 310, a top wall portion 312, a bottom wall portion 314 and an open front side 316. Partition means 318 extend between and are integral with the pair of opposite end wall portions 308 and 310 and divide the housing means 306 into an upper section 320 and a lower section 322. The upper section 320 has an upper surface 324 on the partition means 318 having a plurality of spaced apart elongated reinforcing ribs 326 integral therewith and projecting upwardly therefrom and providing a surface for supporting a tape cartridge 304. The lower section 322 has an upper surface 328 on the bottom wall portion 314. The upper section 320 has a back wall portion 330 integral with the opposite end wall portions 308 and 310 and the top wall portion 312 and a terminal end portion 332 at a location which is about one-quarter of the distance between the top wall portion 312 and the partition means 318. The lower section 322 has a back wall portion 334 integral with the opposite end wall portions 308 and 310 and the partition means 318 and a terminal end portion 336 at a location which is about one-quarter of the distance between the partition means 318 and the bottom wall portion 314. Lip means 338 project upwardly from the front end of the partition means 318 and provide a stop for a tape cartridge 304 supported on the reinforcing rib 326. Lip means 340 project upwardly from the front end of the bottom wall portion 314 and provide a stop for a tape cartridge 304 supported on the upper surface 328. The upper section 320 has a plurality of compartment forming means 342 for dividing the upper section 320 into plurality of compartments 344 each of which is dimensioned to accommodate one tape cartridge 304. The lower section 322 has a plurality of compartment forming means 346 for dividing the lower section 322 into a plurality of compartments 348 each of which is dimensioned to accommodate one tape cartridge 304.

Figures 16, 17A:
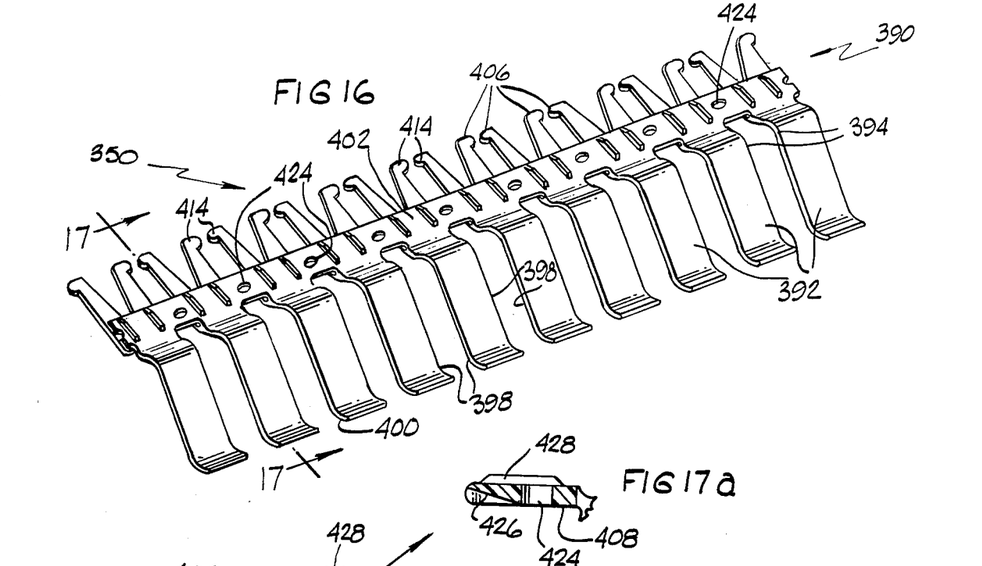
FIG. 16 is a perspective view of the force applying means.
FIG. 17a is an enlarged view of a portion of FIG. 17.
Figure 17:
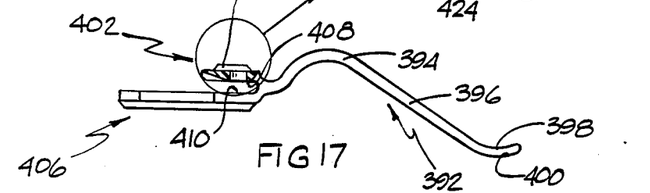
FIG. 17 is a cross-sectional view taken on the line 17—17 of FIG. 16.
Figure 18:
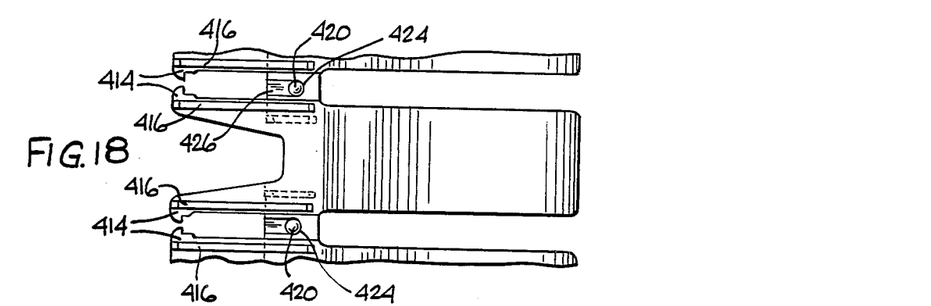
FIG. 18 is an enlarged rear elevational view of a portion of 16.

Separate resilient force applying means 350, illustrated in FIG. 16, are secured to the back wall portions 330 and 334 and function to apply a resilient force, as explained below, to a tape cartridge 304 (FIG. 12) to urge one portion of a tape cartridge 304 into contact with the lip means 338 or 340 and another portion of the tape cartridge 304 into contact with the top wall portion 312 or the partition means 318. The resilient force applying means 350 is formed from a plastic material that is more rigid than the high impact polysterene of the housing means 306 and has a relatively high fatigue resistance such as crystalline thermoplastic homopolymers made by the polymerization of formaldehyde marketed by Du Pont under the designation Delrin 500.

As illustrated in FIGS. 11–13, a flange portion 360 extends upwardly from the front end of the top wall portion 312 and is integral therewith. A reinforcing member 362 projects upwardly from the top wall portion 312 and is integral therewith and with the flange portion 360. The reinforcing members 362 are generally parallel to and aligned with the opposite end wall portions 308 and 310 and have an end surface 364 adapted to contact a surface of a storage rack (not shown) when the holder 302 is positioned in storage or the front surface of the shelves 78. A plurality of reinforcing and support members 36 project downwardly from the bottom wall portion 314 and function to support the holder 302 on a shelf 78 of the holding means of the truck 2. A flange portion 368 projects downwardly from the bottom wall portion 314 and is integral therewith. A reinforcing member 370 projects downwardly from the bottom wall portion 314 and is integral therewith and with the flange portion 368. The reinforcing members 370 are generally parallel to and aligned with the opposite end wall portions 308 and 310 and have an end surface 372 adapted to contact a surface of a shelf 78 (FIG. 1) when the holder 2 is supported thereon. A locking means 374, similar to that illustrated in FIG. 5, is provided to retain the holder on the shelf 78. Also, if desired, the flange portions 360 and 368, the reinforcing members 362 and 370, the end surfaces 364 and 372 and the support members 366 may be omitted and flanges similar to flanges 132 and 134 of FIG. 8 may be used. A plurality of reinforcing strips 376 are integral with the top wall portion 12 and extend downwardly therefrom in the direction of the partition means 318 and also are integral with the back wall portion 330. A plurality of reinforcing strips 378 are integral with the partition means 318 and extend downwardly therefrom in the direction of the upper surface 328 and are also integral with the back wall portion 334.

The resilient force applying means 350 comprises an elongated base member means 390 having a plurality of resilient tab means 392. Each of the resilient tab means 392 has an arcuate portion 394 next adjacent to the base member means 390, a generally linear portion 396 and another arcuate portion 398 having an arcuate surface 400 which is adapted to contact tape cartridge 304. Each arcuate surface 400 is located in one of the compartments 344 or 348.

The elongated base member means 390 comprises an elongated member 402 extending in a longitudinal direction and having a longitudinal axis. A plurality of spaced apart finger means 406 project upwardly from and are integral with the elongated member 402 and extend in a direction generally perpendicular to the longitudinal axis of the elongated member 402. The elongated member 402 has a generally planar surface 408 facing opposite generally planar surfaces 410 on the finger means 406. The distance between the generally planar surfaces 408 and 410 is slightly greater than the thickness of each o the back wall portions 330 and 334 so that the base member means may be readily moved over the back wall portions 330 and 334 so that the back wall portion 330 or 334 is located between the generally planar surfaces 408 and 410. As illustrated in FIGS. 14, 15 and 15a, there are two finger means 406 located in each compartment 344 or 348 and are located between the reinforcing rib 376 or 378 and the compartment forming means 342 or 346.

Figure 19:
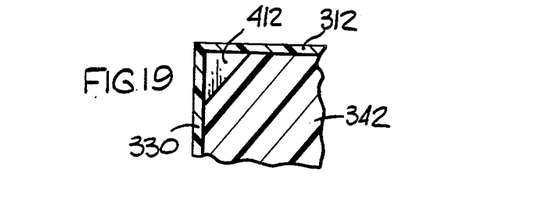
FIG. 19 is a cross-sectional view taken on the line 19—19 of FIG. 13.

Securing means are provided for holding the elongated base member means 390 on the back wall portion 330 or 334 and comprise a first portion comprising an opening 412 (FIGS. 15a and 19) formed in each of the compartment forming means 342 or 346 adjacent to its intersection with the top wall portion 312 and the back wall portion 330 or to its intersection with the partition means 318 and the back wall portion 334. Each of the finger means 406 has a hook means 414 located so that the hook means 414 on one finger means 406 in one compartment 344 or 348 faces the hook means 414 on another finger means 406 in the next adjacent compartment 344 or 348. A portion of each of the hook means 414 extends into each opening 412 but the hook means 414 and the openings 412 are dimensioned so that a slight space exists between the facing hook means 414. Each of the finger means 406 is provided with a reinforcing rib 416 which extends in a direction perpendicular to the longitudinal axis of the elongated member 402. A second portion of the securing means comprises a plurality of spaced apart projections 420 projecting outwardly from the back surface 422 of the back wall portions 330 and 334. The elongated member 402 is provided with a plurality of spaced apart openings 424 which are dimensioned so that the projections 420 may enter into the openings 424. The elongated member 402 is provided with a plurality of spaced apart recesses having inclined surfaces 426 to facilitate passage of the projections 420 over the inclined surfaces 426 and into the openings 424. If desired, the projections 420 and the recesses 424 are omitted. The elongated member 402 is provided with a plurality of reinforcing ribs 428 which extend in a direction perpendicular to the longitudinal axis of the elongated member 402.

The operation of the holder 302 is illustrated in FIG. 12. An individual tape cartridge 304 having a front 430, a top 432, a bottom 434 and a back 436 has been inserted into one of the compartments 344. The distance from the top 432 to the bottom 434 of the tape cartridge 304 is less than the distance between the top wall portion 312 and the top of the lip means 438 so that the individual cartridge tape 304 may pass therebetween. The individual cartridge tape 304 is moved inwardly so that the back 436 contacts the arcuate surface 400 and depresses the resilient tab means 392. The force exerted by the depressed resilient tab means 392 causes the individual cartridge tape 304 to tilt so that a portion of the bottom 434 contacts the lip means 338 and a portion of the top 432 contacts the bottom surface of the top wall portion 312. Thus, the individual cartridge tape 304 is securely retained in the tape cartridge holder 302. When it is desired to remove the individual cartridge tape 304, sufficient pressure is applied to the upper portion of the front 430 adjacent to the top 432 to tilt the individual cartridge tape 304 in the opposite direction so that the bottom 432 is above the lip means 338. The force of the depressed resilient tab means 392 will then move the individual cartridge tape 304 outwardly so that it may be readily removed from the tape cartridge holder 302.

It is contemplated that the inventive concepts herein described may be variously otherwise embodied and it is intended that the appended claims be construed to include alternative embodiments of he invention except insofar as limited by the prior art.

What is claimed is:

1. A holder for tape cartridges comprising:
a housing integrally molded using a relatively rigid plastic material and having an open side in the front portion thereof;
said housing having a pair of opposite end wall portions, a top wall portion and a bottom wall portion;
partition means extending between and integral with said pair of opposite end wall portions and dividing said housing into an upper section and a lower section;
each of said upper and lower sections having support means on which tape cartridges may be supported and an opposite upper surface;
said upper section having a back wall portion integral with said pair of opposite end wall portions and said top wall portion and terminating at a location which is less than one-third the distance between said top wall portion and said partition means;
said lower section having a back wall portion integral with said pair of opposite end wall portions and said partition means and terminating at a location which is less than one-third the distance between said support means and said opposite upper surface thereof;
compartment forming means in each of said upper and lower sections, each of said compartment forming means forming a compartment having dimensions adapted to receive one tape cartridge therein;
lip means extending upwardly from said partition means and said bottom wall portion and located next adjacent to said front open side to provide an abutment for a tape cartridge;
separate resilient force applying means secured to said back wall portions of said upper and lower sections for applying a resilient force to said tape cartridge in each of said compartments to urge one portion of said tape cartridge into contact with said lip means and another portion of said tape cartridge into contact with said top wall portion or said partition means; and
said resilient force applying means being formed from a plastic material more rigid than said relatively rigid plastic material of said housing.

2. The invention as defined in claim 1 and further comprising:
at least one reinforcing strip in each of said compartments of said upper section;
said reinforcing strip being integral with said top wall portion and depending downwardly therefrom in the direction of said partition means and also being integral with said back wall portion of said upper section;
at least one reinforcing strip in each of said compartments of said lower section; and
said reinforcing strip being integral with said partition means and depending downwardly therefrom in the direction of said lower surface of said lower section and also being integral with said back wall portion of said lower section.

3. The invention as defined in claim 1 wherein said separate resilient force applying means comprises:
   a plurality of resilient tabs each having a portion thereof located in each of said compartments;
   an elongated base member adapted to be secured to said back wall portion of said upper section or of said lower section; and
   said resilient tabs being integral with said elongated base member.

4. The invention as defined in claim 3 wherein said elongated base member comprises:
   an elongated member extending in a longitudinal direction and having a longitudinal axis;
   a plurality of spaced apart fingers are integral with said elongated member and extend in a direction that is perpendicular to said longitudinal axis of said elongated member;
   said elongated member and said fingers having oppositely facing spaced apart inner surfaces which are substantially parallel to each other so that said elongated base member may be positioned with said back wall portion of said upper section or said lower section located therebetween; and
   securing means for securing said elongated base member to either of said back wall portions.

5. The invention as defined in claim 4 wherein a first portion of said securing means comprises:
   an opening formed in each of said compartment forming means located next adjacent to the junction of said top wall portion and said back wall portion of said upper section or the junction of said partition means and said back wall portion of said lower section; and
   each of said fingers having a hook member having at least a portion thereof located in said opening in said compartment forming means.

6. The invention as defined in claim 5 wherein a second portion of said securing means comprises:
   each of said back wall portions having a back surface;
   a plurality of spaced apart projections projecting outwardly from each of said back surfaces;
   a plurality of spaced apart openings in said elongated member; and
   said projections being located in said openings when said elongated base member means is positioned on each of said back wall portions.

7. The invention as defined in claim 6 and further comprising:
   said elongated member having an outer surface; and
   at least one integral reinforcing rib projecting outwardly from said outer surface and extending in a direction perpendicular to said longitudinal axis of said elongated member and being located between each of said openings in said elongated member.

8. The invention as defined in claim 7 wherein said at least one integral reinforcing rib comprises:
   a pair of spaced apart reinforcing ribs.

9. The invention as defined in claim 5 and further comprising:
   each of said fingers having an outer surface; and
   at least one integral reinforcing rib projecting outwardly from said outer surface of each of said fingers and extending in a direction perpendicular to said longitudinal axis of said elongated member.

10. The invention as defined in claim 9 wherein:
    each of said openings in said compartment forming means having a linear extent equal to the thickness of said compartment forming means;
    each of said hook member having an end portion facing but spaced from an end portion of the next adjacent hook member; and
    said spacing between said facing end portions being less than one-half of the linear extent of said opening in each of said compartment forming means.

11. The invention as defined in claim 10 and further comprising:
    said elongated member having a longitudinally extending free edge portion;
    a plurality of recesses formed in said outer surface of said elongated member;
    each of said recesses extending from said outer edge portion to one of said openings in said elongated member; and
    each of said recesses having an inclined surface to facilitate the movement of said elongated member over said projections extending outwardly from said back surface of each of said back wall portions.

12. The invention as defined in claim 5 and further comprising:
    said elongated member having an outer surface; and
    a plurality of reinforcing ribs projecting outwardly from said outer surface and extending in a direction perpendicular to said longitudinal axis of said elongated member.

13. The invention as defined in claim 12 and further comprising:
    each of said fingers having an outer surface; and
    at least one integral reinforcing rib projecting outwardly from said outer surface of each of said fingers and extending in a direction perpendicular to said longitudinal axis of said elongated member.

14. The invention as defined in claim 13 wherein:
    each of said openings in said compartment forming means having a linear extend equal to the thickness of said compartment forming means;
    each of said hook members having an end portion facing but spaced from an end portion of the next adjacent hook member; and
    said spacing between said facing end portions being less than one-half of the linear extent of said opening in each of said compartment forming means.

15. The invention as defined in claim 14 wherein:
    said force applying means being formed from a plastic material having relatively high fatigue resistance.

16. The invention as defined in claim 1 wherein:
    said force applying means being formed from a plastic material having relatively high fatigue resistance.

17. The invention as defined in claim 16 wherein said separate resilient force applying means comprises:
    a plurality of resilient tabs each having a portion thereof located in each of said compartments;
    an elongated base member adapted to be secured to said back wall portion of said upper section or of said lower section; and
    said resilient tabs being integral with said elongated base member.

18. The invention as defined in claim 17 wherein said elongated base member comprises:
    an elongated member extending in a longitudinal direction and having a longitudinal axis;
    a plurality of spaced apart fingers are integral with said elongated member and extend in a direction that is perpendicular to said longitudinal axis of said elongated member;

said elongated member and said fingers having oppositely facing spaced apart inner surfaces which are substantially parallel to each other so that said elongated base member may be positioned with said back wall portion of said upper section or said lower section located therebetween; and securing means for securing said elongated base member to either of said back wall portions.

19. The invention as defined in claim 18 wherein said securing means comprises:

an opening formed in each of said compartment forming means located next adjacent to the junction of said top wall portion and said back wall portion of said upper section or the junction of said partition means and said back wall portion of said lower section; and each of said fingers having a hook member having at least a portion thereof located in said opening in said compartment forming means.

20. The invention as defined in claim 19 and further comprising:

each of said openings in said compartment forming means having a linear extend equal to the thickness of said compartment forming means;

each of said hook members having an end portion facing but spaced from an end portion of the next adjacent hook member; and said spacing between said facing end portions being less than one-half of the linear extent of said opening in each of said compartment forming means.

* * * * *